United States Patent
McRoberts

(10) Patent No.: US 7,059,952 B1
(45) Date of Patent: Jun. 13, 2006

(54) FILLETING ASSEMBLY AND METHOD OF USING SAME

(76) Inventor: Vince McRoberts, 4301 SE. Bridle Ct., Lee's Summit, MO (US) 64082

( * ) Notice: Subject to any disclaimer, the term of this patent is extended or adjusted under 35 U.S.C. 154(b) by 0 days.

(21) Appl. No.: 11/094,859

(22) Filed: Mar. 31, 2005

(51) Int. Cl.
A22C 25/02 (2006.01)

(52) U.S. Cl. .................................... 452/105
(58) Field of Classification Search ............ None
See application file for complete search history.

(56) References Cited

U.S. PATENT DOCUMENTS

| | | | |
|---|---|---|---|
| 3,955,278 A | 5/1976 | Popeil | |
| 3,987,694 A | 10/1976 | Kaufman | |
| 4,015,330 A | 4/1977 | Popeil et al. | |
| 4,017,063 A | 4/1977 | Brusich | |
| 4,056,866 A | 11/1977 | Wenzel | |
| 4,065,115 A | 12/1977 | Popeil et al. | |
| 4,112,547 A | 9/1978 | Glushkov et al. | |
| 4,116,426 A | 9/1978 | Kessler | |
| 4,243,184 A | 1/1981 | Wright | |
| 4,318,537 A | 3/1982 | Dorman et al. | |
| 4,334,463 A * | 6/1982 | Goldie | 99/426 |
| 4,454,630 A | 6/1984 | Shouldis | |
| 4,485,527 A | 12/1984 | Stachowiak | |
| 4,531,260 A | 7/1985 | Klamm | |
| 4,574,430 A | 3/1986 | Hartmann | |
| 4,615,078 A | 10/1986 | Teich | |
| 4,756,519 A | 7/1988 | Lilja | |
| 4,765,603 A | 8/1988 | Huppert | |
| 4,793,027 A * | 12/1988 | Blight | 452/185 |
| 4,794,670 A * | 1/1989 | Savastano, Jr. | 452/149 |
| 4,798,372 A | 1/1989 | Tingle | |
| 4,930,188 A | 6/1990 | Hyde | |
| 4,977,644 A | 12/1990 | Evans et al. | |
| 5,027,544 A | 7/1991 | Schlaegel | |
| 5,088,958 A | 2/1992 | Evers et al. | |
| 5,100,115 A | 3/1992 | Schorn | |
| 5,106,335 A | 4/1992 | Behnk et al. | |
| 5,261,561 A | 11/1993 | Hodges, Jr. | |
| D342,873 S | 1/1994 | Dannenberg | |
| D352,427 S | 11/1994 | Burd | |
| 5,386,978 A | 2/1995 | Ladwig | |
| 5,482,502 A | 1/1996 | Hjorth | |
| 5,520,576 A | 5/1996 | Wastell et al. | |
| D370,602 S | 6/1996 | Kegley | |
| 5,522,765 A | 6/1996 | Dotson et al. | |
| 5,527,022 A | 6/1996 | Gibson | |
| 5,609,521 A | 3/1997 | Allred et al. | |
| 5,636,469 A * | 6/1997 | Pizzolo et al. | 43/54.1 |
| 5,860,367 A | 1/1999 | Riegel et al. | |
| 5,893,459 A | 4/1999 | Croft | |
| 5,911,621 A | 6/1999 | Durst et al. | |
| 5,938,185 A | 8/1999 | Kletter | |
| 6,117,004 A | 9/2000 | Fure | |
| 6,164,478 A | 12/2000 | Cant | |

(Continued)

Primary Examiner—Thomas Price
(74) Attorney, Agent, or Firm—Hovey Williams LLP

(57) ABSTRACT

A filleting assembly (10) adapted for field use includes a flexible sheet (12) equipped with a clamp (14), together with a tie-down assembly (16) allowing the sheet to be secured in place to a variety of different supports. The sheet (12) is preferably formed of a flexible, synthetic material. The tie-down assembly (16) is comprised of a plurality of elongated, stretchable tie-down cords (40) having end-mounted attachment hooks (42). If desired, the sheet (12) may include a mount (28) for a filleting knife (34), and a carry bag (44) may be provided for transport of the assembly (10).

13 Claims, 3 Drawing Sheets

U.S. PATENT DOCUMENTS

| | | |
|---|---|---|
| 6,200,212 B1 | 3/2001 | Henry et al. |
| 6,341,770 B1 | 1/2002 | Landherr |
| 6,359,239 B1 | 3/2002 | Missler et al. |
| 6,371,190 B1 * | 4/2002 | Owens ................. 160/135 |
| 6,422,551 B1 | 7/2002 | Brotz |
| 6,460,841 B1 | 10/2002 | Durr |
| 6,478,293 B1 | 11/2002 | Keener |
| 6,579,816 B1 * | 6/2003 | Lockett ................. 442/417 |
| 6,591,541 B1 | 7/2003 | Cummings |
| 6,644,639 B1 | 11/2003 | Newton |
| 6,695,299 B1 | 2/2004 | Brotz |
| 6,726,050 B1 | 4/2004 | Barentine et al. |
| 6,759,114 B1 | 7/2004 | Wu et al. |
| 6,789,792 B1 | 9/2004 | Angland |
| 6,811,479 B1 | 11/2004 | Pedersen |
| 6,836,910 B1 | 1/2005 | Cawthon |
| 6,889,969 B1 * | 5/2005 | Diermeier et al. ...... 269/289 R |
| 2003/0097915 A1 | 5/2003 | Chen et al. |

* cited by examiner

FILLETING ASSEMBLY AND METHOD OF USING SAME

BACKGROUND OF THE INVENTION

1. Field of the Invention

The present invention is broadly concerned with a portable filleting assembly for use when manually filleting or cleaning fish, wherein the assembly can be used in the field on a variety of available supports. More particularly, the invention is concerned with such a filleting assembly in the form of a flexible sheet equipped with a fish-holding clamp and a tie-down assembly for temporarily securing the sheet to a support.

2. Description of the Prior Art

A variety of cutting boards and similar devices has been provided in the past for cutting or filleting of fish or other meats. Generally speaking, the cutting boards are of a relatively robust construction and may be formed of hardwoods, metal, or rigid synthetic resin materials. Disposable cutting boards have also been proposed (see U.S. Pat. No. 6,164,478), as have flexible cutting boards (see U.S. Patent Application Publication US 2003/0097915).

Specific fish cleaning devices have also been proposed, such as that depicted in U.S. Pat. No. 4,454,630. However, these devices are relatively complex and expensive and moreover, do not readily lend themselves for easy and adaptable field use.

There is therefore a need for an improved filleting sheet adapted for use when cleaning and filleting a fish, wherein the sheet may be readily usable in the field, is not unduly cumbersome to carry, and is easily cleanable and storable, even under possible adverse field conditions.

SUMMARY OF THE INVENTION

The present invention is directed to a filleting assembly especially designed and adapted for field use by fishermen. Broadly speaking, the filleting assembly hereof includes an elongated, flexible sheet of size to support a fish to be filleted or cleaned, a clamp secured to one face of the sheet and operable to hold the fish in place thereon, and a tie-down apparatus operatively secured to the sheet to permit attachment thereof to a number of different supports, such as boulders, trees stumps, or the like.

In preferred forms, the sheet is fabricated from a flexible, synthetic resin material having a thickness of from about 0.02–0.04 inches. The clamp is a spring-loaded, jaw-type clamp and is pivotally attached to the sheet so that it can be adjusted for optimum efficiency. The tie-down apparatus preferably comprises a pair of elongated, stretchable cords with corresponding grommets in the sheet. The cords are equipped with end-mounted hooks to engage the grommets.

In operation, a user may tie down or otherwise removably secure the sheet to a support using the tie-down apparatus. Because the sheet is flexible, the support need not be a substantially flat surface. Additionally, the tie-down apparatus allows the sheet to be secured to the support to provide a filleting and cutting location in conditions where such a location is not otherwise available, such as when the user is backpacking and fishing in remote locations.

When not in use, the filleting assembly may be rolled up to a compact size, and the tie-down cords can be used to hold the sheet in a coiled condition. This allows the filleting assembly to be carried in the user's backpack, rummage sack, or other location where the ability to readily fold without damage is advantageous. Further, the filleting assembly is light, which is desirable to backpackers who seek to lighten the weight carried. Further yet, the filleting assembly is easily cleaned and can be transported to a source of water or other cleaning material, as opposed to bringing the cleaning material to the filleting assembly.

DETAILED DESCRIPTION OF THE PREFERRED EMBODIMENT

Figure 1:
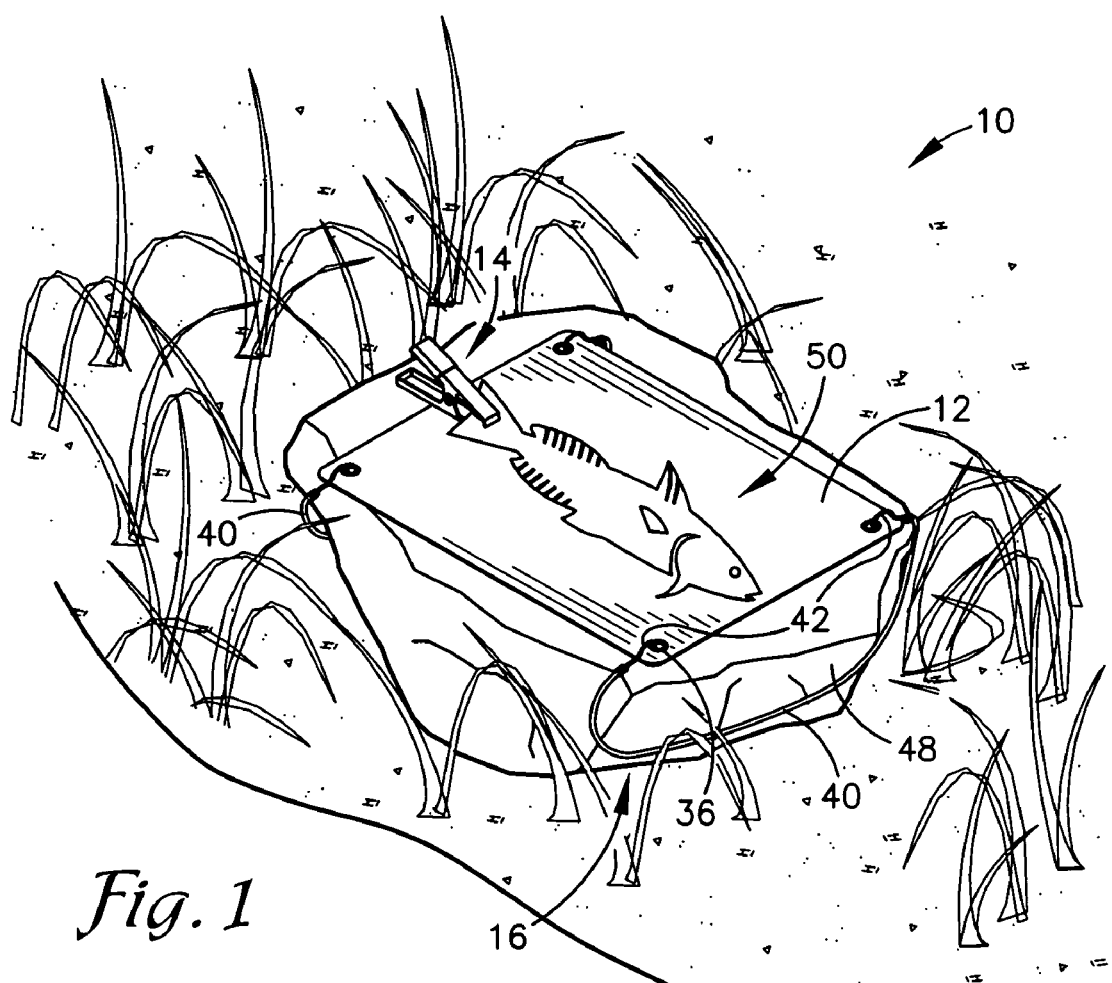
FIG. 1 is a perspective view of a filleting assembly in accordance with the invention shown mounted on a boulder or similar support and being used for filleting a fish.

Turning now to the drawings, a filleting assembly 10 in accordance with the invention broadly comprises an elongated, flexible sheet 12; a clamp 14 pivotally mounted to the sheet 12; and a tie-down apparatus 16 for removably securing the sheet 12 to a variety of different supports in the field, such as a boulder or tree stump.

In more detail, the sheet 12 in the form shown is generally rectangular and made of a synthetic resin material (e.g., a material selected from the group consisting of polycarbonate, polyester, polystyrene, and polyurethane materials) having a thickness generally in the range of from about 0.02–0.04 inches, and most preferably around 0.028 inches. The material preferably provides a cutting surface that is receptive to cuts made from a knife under normal food-cutting circumstances. As such, use of a knife for food-cutting purposes should not damage the material, such that the material is inoperable for use as a cutting surface. It is understood that relatively slight indentations from the knife blade do not damage the material, such that it is inoperable as a cutting surface.

It is preferable that the material be of sufficient flexibility to allow the sheet 12 to be manually rolled for convenient storage, without breakage or damage to the sheet 12. An upper surface 20 of the sheet 12 may be textured (not shown) to provide a non-slip surface, such as providing raised grips, a roughened surface, or other suitable non-slip means.

The sheet 12 is preferably sized to receive a fish or other item to be filleted or cut, as illustrated in FIG. 1. As such, the sheet's size may vary, depending on the environment of use. Preferably, the sheet size ranges from approximately seven inches to thirty inches in length and approximately six inches to twenty-four inches in width, with a more preferable length of approximately ten inches to twenty-two inches and a more preferable width of approximately nine inches to eighteen inches, and most preferably having a length of fifteen inches and a width of twelve inches.

Figure 2:
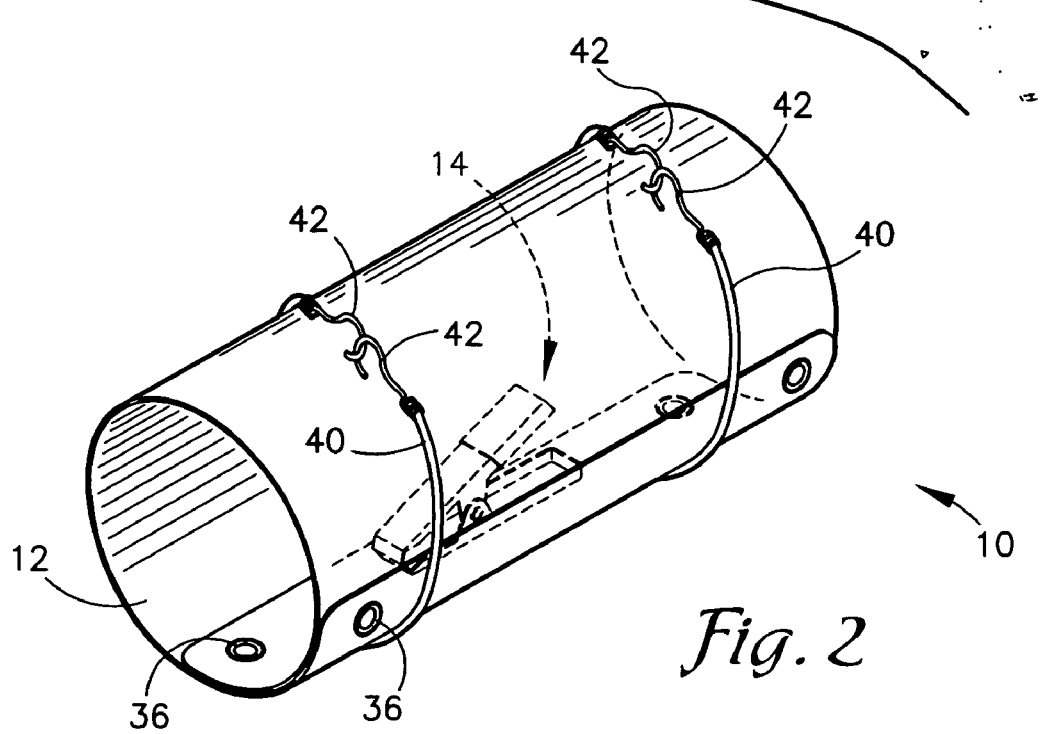
FIG. 2 is a perspective view of the filleting assembly of the invention shown in a rolled-up or coiled configuration for storage.
Figure 4:
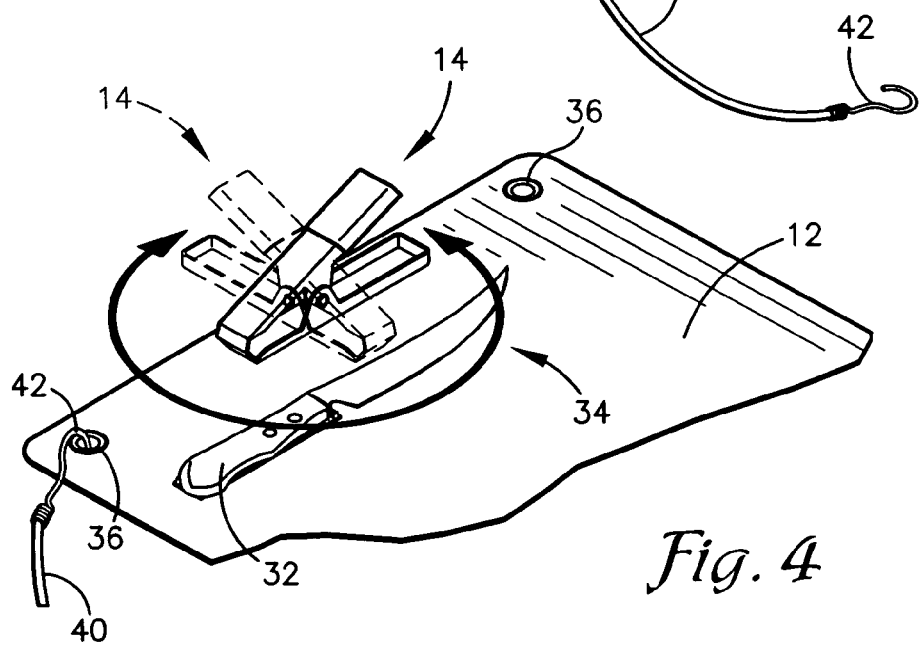
FIG. 4 is a fragmentary view of the filleting assembly, illustrating the pivotal connection of the fish-holding clamp.

The clamp 14 in the illustrated embodiment is in the form of a spring-loaded, pivotal clamp having legs 22 and 24 cooperatively defining a jaw 26. Advantageously, the leg 24 is pivotally secured to the sheet 12, thereby permitting the clamp 14 to be rotated, as depicted in FIG. 4, to a convenient holding position. When the filleting assembly 10 is not in use, the clamp 14 may be rotated, such that it substantially lies on the sheet 12 to facilitate rolling and securement of the sheet 12 for storage and transport, as illustrated in FIG. 2.

The clamp 14 is preferably made of a lightweight plastic that resists breakage, although other suitable materials may be used. The jaw 26 of the clamp 14 may also include teeth (not shown) to assist in holding the fish or other item to be cut or filleted.

Figure 3:
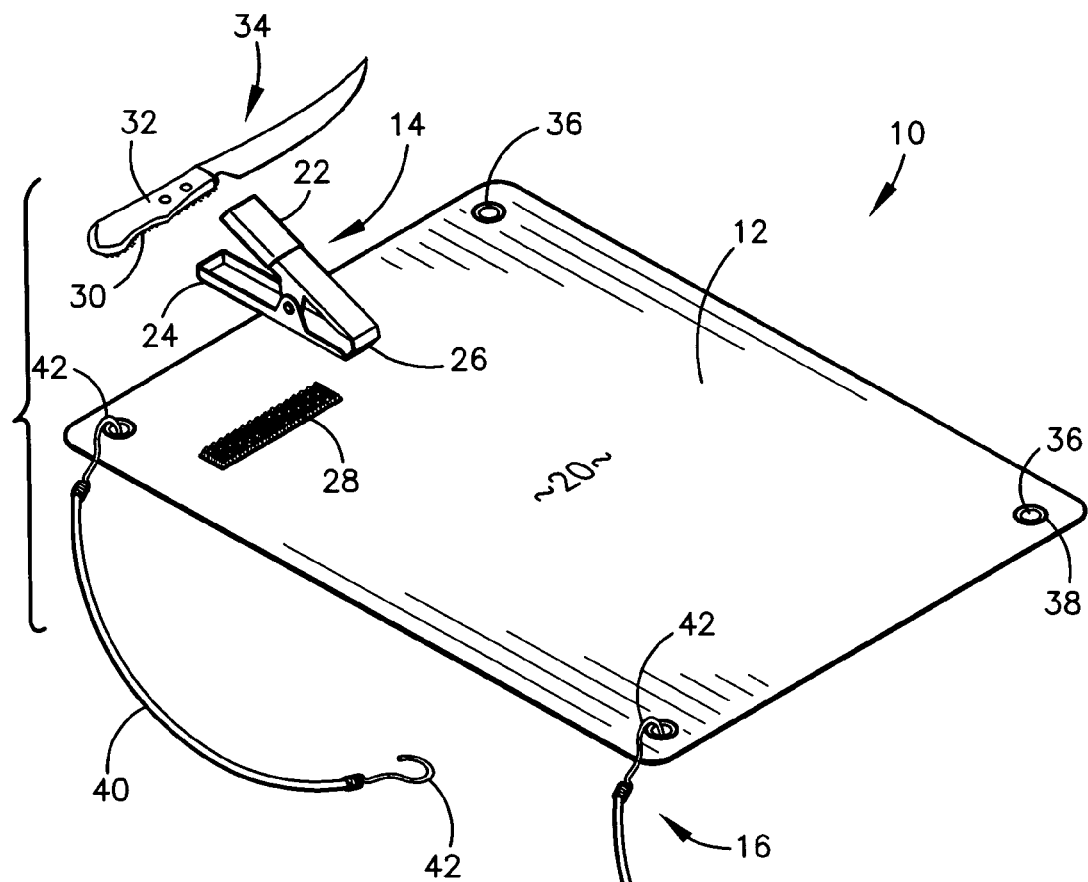
FIG. 3 is a perspective exploded view of the preferred filleting assembly.

The sheet 12 is also equipped with a hook and loop fabric strip 28 of "VELCRO" or similar material. A complemental hook and loop strip 30 is attached to the handle 32 of filleting knife 34, as illustrated in FIG. 3. Accordingly, the knife 34 may be temporarily secured to the sheet 12 but can readily be detached for filleting purposes. When not in use, the knife 34 can be secured to the sheet 12 such that the knife 34 refrains from movement within a user's backpack or other storage location. The hook and loop fabric strips 28, 30 may be oriented differently than what is illustrated in the Figures, depending on a length of the knife 34.

The tie-down assembly 16 is preferably in the form of corner-mounted metallic grommets 36 provided in the sheet 12 and thus defining corresponding through-openings 38, as illustrated in FIG. 3. The assembly 16 further includes a pair of elongated, flexible, elastic, and stretchable tie-down cords 40 (often referred to as "bungee" cords). The opposed ends of each of the cords 40 have respective hook fasteners 42 sized to be received within the through-openings 38 of the grommets 36, as shown in FIGS. 3 and 4. More or less grommets 36 and tie-down cords 40 may be included, depending on the size of the sheet 12 and the desired securement of the sheet 12.

The tie-down assembly 16 allows for securement of the sheet 12 in a variety of locations that do not necessarily present a substantially flat surface on which to place the sheet 12. As such, the filleting assembly 10 can be used in locations where a surface on which to fillet the fish or other item is not otherwise available. Additionally, due to the flexibility of the sheet 12 and the tie-down assembly 16, the sheet 12 may be secured to a support that presents unwieldy surfaces, such as an angled surface or a rough or jagged surface.

Figure 5:
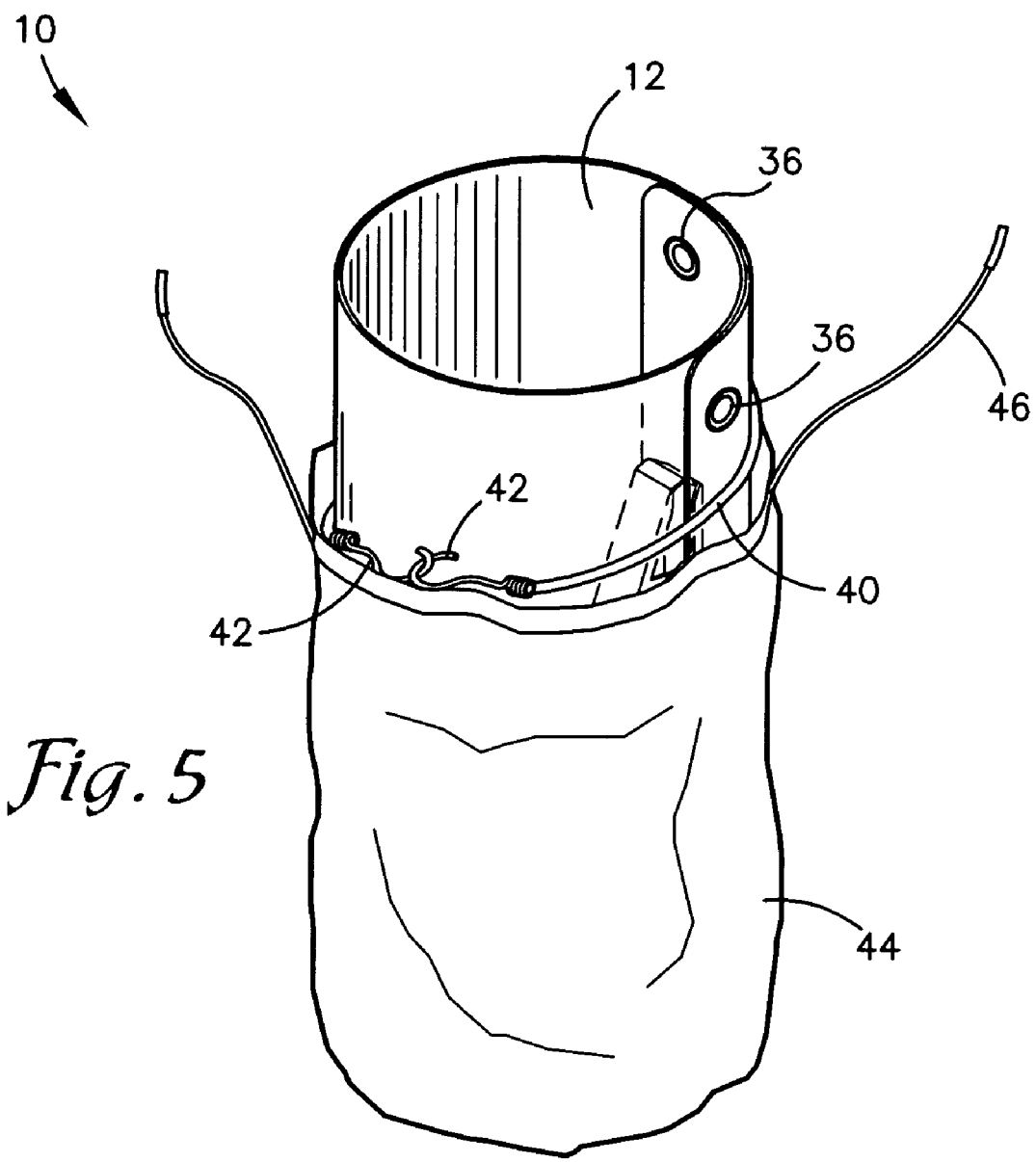
FIG. 5 is a perspective view showing the filleting assembly of the invention stored in a carry bag.

FIGS. 2 and 5 depict the assembly 10 in its rolled-up storage and carry configuration. In this form, the sheet 12 is rolled so as to place the clamp 14 within the confines of the rolled-up sheet 12, as described above. Moreover, the tie-down cords 40 are used to hold the sheet in this condition, and for this purpose, the end-mounted hooks 42 of each cord 40 may be interfitted, as best illustrated in FIG. 2. If desired, a carry bag 44 may be provided having a drawstring 46. The rolled-up assembly 10 can be inserted within the bag 44 to facilitate carrying of the assembly.

The use of assembly 10 is best illustrated in FIG. 1. In particular, the sheet 12 is unrolled and placed atop boulder 48 or other support, whereupon the tie-down cords 40 are stretched around the boulder 48 and interconnected within the corner grommets 36. This serves to hold the sheet 12 temporarily and removably in place on the boulder 48. Next, the clamp 14 is manipulated to hold a fish 50 to be filleted, usually by clamping the tail of the fish. The fish 50 can then be readily filleted or cleaned as desired. The assembly 10 allows for easy clean-up after filleting, followed by rolling the sheet 12 back into its storage condition as shown in FIGS. 2 and 5.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A filleting assembly comprising:
   an elongated, flexible sheet of size to support a fish to be filleted;
   a clamp directly secured to one face of said sheet and operable to hold a fish in place thereon; and
   a tie-down apparatus operatively secured to said sheet and adapted for removably securing said sheet to a support.

2. The assembly of claim 1, said sheet formed of a synthetic resin material.

3. The assembly of claim 2, said material selected from the group consisting of polycarbonate, polyester, polystyrene, and polyurethane materials.

4. The assembly of claim 1, said sheet having a thickness of from about 0.02–0.04 inches.

5. The assembly of claim 1, said clamp being pivotally secured to said sheet.

6. The assembly of claim 1, said clamp being spring-loaded.

7. The assembly of claim 1, said tie-down apparatus comprising at least one tie-down cord.

8. The assembly of claim 7, said tie-down apparatus comprising a plurality of tie-down apertures provided in said sheet, wherein the at least one tie-down cord is engagable with at least one of said apertures for attachment of the sheet to said support.

9. The assembly of claim 7, said tie-down cord being of a stretchable, elastic material.

10. The assembly of claim 1, said sheet being capable of being rolled to a compact configuration.

11. The assembly of claim 1, further including a mount on said sheet for removable attachment of a filleting knife to the sheet.

12. The assembly of claim 11, said mount comprising complementary hook and loop material secured to said sheet and adapted for connection to said knife.

13. A filleting assembly comprising:
   an elongated sheet of size to support a fish to be filleted, wherein the sheet is sufficiently flexible to be manipulated into a compact configuration for storage;
   a clamp pivotally secured to one face of said sheet and operable to hold a fish in place thereon;
   a tie-down apparatus comprising at least one tie-down cord operatively secured to said sheet and adapted for removably securing said sheet to a support when the sheet is in an elongated configuration and further adapted for securing the sheet in the compact configuration; and
   a plurality of tie-down apertures provided in said sheet, wherein the at least one tie-down cord is engagable with at least one of said apertures for attachment of the sheet to said support.

* * * * *